US010613734B2

(12) United States Patent
Cunningham

(10) Patent No.: US 10,613,734 B2
(45) Date of Patent: Apr. 7, 2020

(54) SYSTEMS AND METHODS FOR CONCURRENT GRAPHICAL USER INTERFACE TRANSITIONS

(71) Applicant: Facebook, Inc., Menlo Park, CA (US)

(72) Inventor: Benjamin Grady Cunningham, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 200 days.

(21) Appl. No.: 15/204,888

(22) Filed: Jul. 7, 2016

(65) Prior Publication Data
US 2018/0011719 A1    Jan. 11, 2018

(51) Int. Cl.
G06F 3/0485 (2013.01)
G06F 3/0482 (2013.01)
G06F 3/0484 (2013.01)
G06F 9/451 (2018.01)
G06F 3/0488 (2013.01)

(52) U.S. Cl.
CPC .......... *G06F 3/0485* (2013.01); *G06F 3/0482* (2013.01); *G06F 3/0484* (2013.01); *G06F 3/04847* (2013.01); *G06F 3/04883* (2013.01); *G06F 9/451* (2018.02); *G06F 2203/04806* (2013.01)

(58) Field of Classification Search
CPC ....... G06F 3/0485; G06F 9/451; G06F 3/0482
USPC ................................. 345/619, 661
See application file for complete search history.

(56) References Cited

U.S. PATENT DOCUMENTS

| 8,407,606 | B1* | 3/2013 | Davidson | G06F 3/0488 345/173 |
| 9,152,317 | B2* | 10/2015 | Larco | G06F 3/0482 |
| 9,761,035 | B1* | 9/2017 | Flores | G06T 13/80 |
| 2007/0262996 | A1* | 11/2007 | Fernandez | G06T 13/00 345/473 |
| 2011/0214079 | A1* | 9/2011 | Young | G06F 9/451 715/765 |
| 2013/0283208 | A1* | 10/2013 | Bychkov | G06F 3/017 715/810 |
| 2017/0038846 | A1* | 2/2017 | Minnen | G06F 3/017 |
| 2017/0300122 | A1* | 10/2017 | Kramer | G06F 3/017 |

OTHER PUBLICATIONS

Shen, Chia, Frédéric D. Vernier, Clifton Forlines, and Meredith Ringel, "DiamondSpin: An Extensible Toolkit for Around-The-Table Interaction", In Proceedings of the SIGCHI conference on Human factors in computing systems, pp. 167-174, ACM, 2004.*

* cited by examiner

*Primary Examiner* — Sarah Lhymn
(74) *Attorney, Agent, or Firm* — Sheppard Mullin Richter & Hampton LLP

(57) ABSTRACT

Systems, methods, and non-transitory computer-readable media can receive a first user interaction associated with a first transition in a graphical user interface. The first transition is executed in the graphical user interface. A second user interaction associated with a second transition in the graphical user interface is received during the executing the first transition. The second transition is executed in the graphical user interface during the executing the first transition.

18 Claims, 7 Drawing Sheets

SYSTEMS AND METHODS FOR CONCURRENT GRAPHICAL USER INTERFACE TRANSITIONS

FIELD OF THE INVENTION

The present technology relates to the field of graphical user interfaces. More particularly, the present technology relates to provision of concurrent graphical user interface transitions.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

Users of a social networking system can be provided with a user interface to interact with media content items posted to the social networking system by other users. For example, users can view and interact with interactive articles or other interactive publications on the social networking system. For example, a user can tap on an image in the interactive article to zoom in or zoom out, or swipe through multiple images or videos. By improving a user's experience with viewing and interacting with articles or publications on the social networking system, a user's experience with the social networking system as a whole can be improved.

SUMMARY

Various embodiments of the present disclosure can include systems, methods, and non-transitory computer readable media configured to receive a first user interaction associated with a first transition in a graphical user interface. The first transition is executed in the graphical user interface. A second user interaction associated with a second transition in the graphical user interface is received during the executing the first transition. The second transition is executed in the graphical user interface during the executing the first transition.

In an embodiment, a first dynamic framesetter comprising a first origin state and a first destination state is defined based on the first user interaction and the first transition.

In an embodiment, the executing the first transition comprises interpolating between the first origin state and the first destination state, and recursively updating the graphical user interface based on the interpolating.

In an embodiment, a second dynamic framesetter comprising a second origin state and a second destination state is defined based on the second user interaction and the second transition, wherein the second origin state comprises the first dynamic framesetter.

In an embodiment, the executing the second transition comprises recursively requesting a current state of the first dynamic framesetter, interpolating between the current state of the first dynamic framesetter and the second destination state, and recursively updating the graphical user interface based on the interpolating between the current state of the first dynamic framesetter and the second destination state.

In an embodiment, the at least one of the first origin state, the first destination state, and the second destination state comprises a static framesetter.

In an embodiment, the origin state of the second dynamic framesetter comprises at least one of a static framesetter or a dynamic framesetter.

In an embodiment, the graphical user interface comprises an interactive article user interface.

In an embodiment, the first transition comprises expanding an image object in an interactive article.

In an embodiment, the first transition comprises collapsing an image object in an interactive article.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
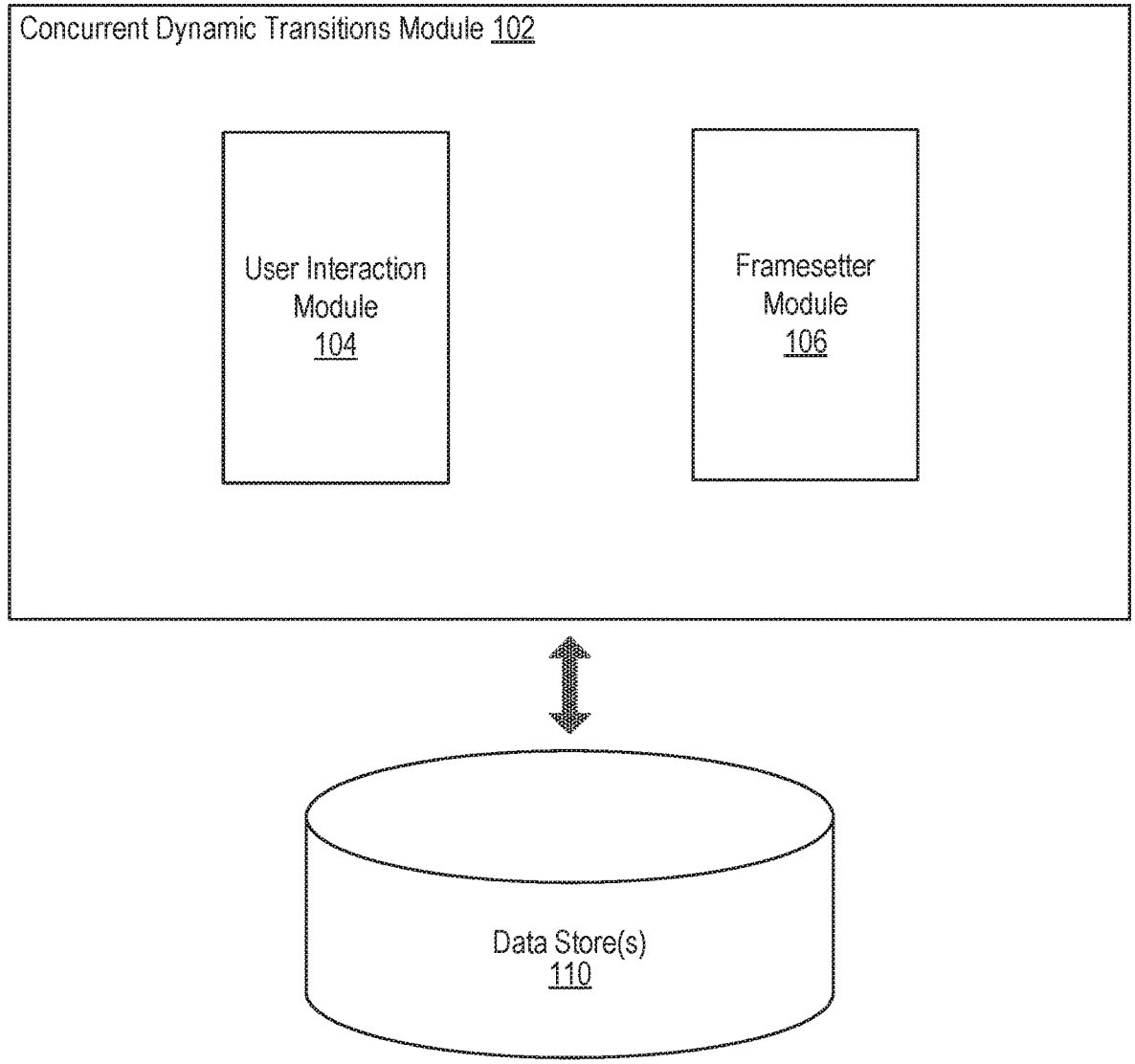
FIG. 1 illustrates an example system including a concurrent dynamic transitions module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Concurrent User Interface Transitions and Interactions

People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (i.e., a social networking service, a social network, etc.). For example, users can add friends or contacts, provide, post, or publish content items, such as text, notes, status updates, links, pictures, videos, and audio, via the social networking system.

Users of a social networking system can be provided with a user interface to interact with media content items posted to the social networking system by other users. For example, users can share and/or view interactive articles or other interactive publications on the social networking system. A user can view and interact with interactive articles or publications. For example, a user can tap on an image in the interactive article to zoom in or zoom out, or swipe through multiple images or videos. By improving a user's experience with viewing and interacting with articles or publications on the social networking system, a user's experience with the social networking system as a whole can be improved.

It continues to be an important interest for a social networking system to improve the user experience of users viewing and interacting with content on the social networking system. Continued user interaction with content posted to the social networking is an important aspect of maintaining continued interest in and participation on the social networking system. User interactions can include user interactions with interactive articles or publications, including media content embedded within such interactive articles or publications. Examples of user interactions with an interactive article or publication can include scrolling through the interactive article, tapping on an image to zoom in or zoom out, or swiping across an image to move between multiple images. While such interactions can provide a rich, interactive viewing environment for a user, it can be frustrating when interactions and the resulting animations or transitions are clunky or non-responsive. For example, it can be frustrating when a user initiates a first transition with a first interaction, e.g., tapping on an image to zoom out of the image, and then a second interaction, e.g., tapping on a second image to zoom into the second image, is ignored because the first transition has not yet completed. This is particularly true given that certain transitions or animations may take longer than expected to complete, or the completion of a transition may be imperceptible or undetectable by a user. In another example, it can also be jarring or unpleasant when a second interaction results in a first transition from a first interaction completing abruptly to begin the second transition.

An improved approach rooted in computer technology overcomes the foregoing and other disadvantages associated with conventional approaches specifically arising in the realm of computer technology. Based on computer technology, the disclosed technology can process and execute multiple user-initiated transitions smoothly and concurrently. For example, when a user interacts with an interactive article, the user's interaction can result in a corresponding transition, e.g., tapping on a zoomed out image can result in the transition of zooming into the image. Such animations or transitions can be defined by an origin state, defining the display characteristics before the transition takes place, and a destination state, defining the display characteristics after the transition takes place. A static framesetter can define static, pre-calculated display characteristics. A dynamic framesetter can be utilized to transition from an origin state to a destination state by interpolating between the origin state and the destination state, and recursively updating the display characteristics to transition from the origin state to the destination state. In the example of tapping on an image to zoom in, a dynamic framesetter can receive the display characteristics of the origin state, i.e., a zoomed out image, and also the display characteristics of the destination state, i.e., a zoomed in image, and interpolate between the two states, and then recursively update the display characteristics to gradually, frame-by-frame, transition from a zoomed out image to a zoomed in image. The presently disclosed technology allows for natural, concurrent execution of multiple transitions by allowing for a dynamic framesetter to receive a static framesetter or a dynamic framesetter as the origin state and/or the dynamic state. These concepts will be described in greater detail below with reference to the figures.

FIG. 1 illustrates an example system 100 including an example concurrent dynamic transitions module 102 configured to process and display concurrent user interface transitions, according to an embodiment of the present disclosure. The concurrent dynamic transitions module 102 can be configured to receive a first user interaction associated with a first transition, and receive a second user interaction associated with a second transition before the first transition has completed, The first transition and the second transition can be concurrently executed until they have both run to completion. A static framesetter can define a set of discrete, pre-calculated display characteristics to be displayed on a user's computing device, such as a mobile device. A dynamic framesetter can be used to carry out transitions. A dynamic framesetter can be defined by an origin state and a destination state, and can transition the display on the user's computing device from the origin state to the destination by interpolating between the two states, and then recursively updating the display characteristics to frame-by-frame change the display from the origin state to the destination state. The concurrent dynamic transitions module 102 can be configured such that a dynamic framesetter can receive as an origin state or a destination state either a static framesetter or another dynamic framesetter. In this way, the concurrent dynamic transitions module 102 can concurrently execute two separate transitions. A first dynamic framesetter associated with a first transition can receive as an origin state or destination state a second dynamic framesetter associated with a second transition. As the first dynamic framesetter transitions from its origin state to its destination state, it can recursively query the second dynamic framesetter for a current display state defining the current display characteristics of the second dynamic framesetter as the second dynamic framesetter transitions from its own origin state to its own destination state.

As shown in the example of FIG. 1, the concurrent dynamic transitions module 102 can include a user interaction module 104 and a framesetter module 106. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

The user interaction module 104 can be configured to receive user interactions as a user interacts with an interactive article. For example, user interactions can include tapping, pinching fingers, spreading fingers, swiping or sliding vertically and/or horizontally, etc. Each user interaction can be associated with one or more transitions. For example, a user tapping on a zoomed out image can be associated with the transition of zooming into the image. The same user interaction of tapping can also be associated with the transition of zooming out of an already zoomed-in image. While the examples of tapping to zoom in or out will be commonly used throughout this disclosure, it should be understood that transitions can include any changes to display characteristics, and any transition can be associated with any user interaction. For example, tapping on an image can result in a change to the opacity or color of the image, or tapping on a video can result in playing the video, or swiping horizontally can result in adjusting an image's brightness or opacity, or can result in swiping between multiple images. User interactions can be associated with one or more transitions as appropriate for a given purpose or implementation.

The framesetter module 106 can be configured to display one or more objects on a user's computing device by defining display characteristics for one or more display objects. For example, the framesetter module 106 can define the size, position, opacity, color, or any other relevant display characteristics for one or more display objects to be displayed on a user's computing device. A static framesetter of the framesetter module 106 can define a discrete set of display characteristics for a static frame, or static display. For example, a static framesetter can define display characteristics to display a one-inch red ball in the center of a user's computing device display. A dynamic framesetter of the framesetter module 106 can cause a display to transition from an origin state to a destination state by interpolating between the two states and recursively updating a current display state to be displayed on the user's computing device display. For example, if a user interaction causes the one-inch red ball in the center of the user's display to move to the bottom of the user's display, then the dynamic framesetter can receive a first static framesetter defining the origin state, i.e., a one-inch red ball positioned in the center of the display, and a second static framesetter defining the destination state, i.e., the one-inch red ball with a revised vertical position such that the red ball is now at the bottom of the display. The dynamic framesetter can interpolate between the first vertical position of the red ball, and the final vertical position of the red ball, and recursively output an updated, current display state in which the vertical position of the red ball is gradually changed so that it moves from the center of the display to the bottom. The dynamic framesetter can be configured to receive as its origin state and/or its destination state a second (or third) dynamic framesetter, so that multiple transitions can be carried out concurrently. For example, consider the scenario of a first user interaction causing a first transition. The first transition can be carried out by a first dynamic framesetter, which receives a first static framesetter as its origin state, and a second static framesetter as its destination state. The first dynamic framesetter is configured to interpolate from the first static framesetter to the second static framesetter and recursively update display characteristics to move from the origin state to the destination state which, to a user, appears as an animation or transition. While that first transition is taking place, the user can take a second action, or second interaction, resulting in a second transition. The second transition results in a second dynamic framesetter, which receives as its origin state the first dynamic framesetter (which is still recursively executing), and as its destination state a third static framesetter representing the final desired display result. As the second dynamic framesetter interpolates and recursively updates from its origin state (the first dynamic framesetter) and its destination state (the third static framesetter), the second dynamic framesetter, at each recursive step, can request a current display state from the first dynamic framesetter. In this way, the second dynamic framesetter can recursively interpolate between the first dynamic framesetter's current display state and the second dynamic framesetter's own destination state, to concurrently execute two transitions at once. The framesetter module 106 is discussed in greater detail herein.

The concurrent dynamic transitions module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the concurrent dynamic transitions module 102 can be implemented, in part or in whole, as software running on one or more computing devices or systems, such as on a server computing system or a user (or client) computing system. For example, the concurrent dynamic transitions module 102 or at least a portion thereof can be implemented as or within an application (e.g., app), a program, or an applet, etc., running on a user computing device or a client computing system, such as the user device 610 of FIG. 6. In another example, the concurrent dynamic transitions module 102 or at least a portion thereof can be implemented using one or more computing devices or systems that include one or more servers, such as network servers or cloud servers. In some instances, the concurrent dynamic transitions module 102 can, in part or in whole, be implemented within or configured to operate in conjunction with a social networking system (or service), such as the social networking system 630 of FIG. 6. It should be understood that there can be many variations or other possibilities.

The concurrent dynamic transitions module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 110 can store information that is utilized by the concurrent dynamic transitions module 102. For example, the data store 110 can store interactive article information, user interaction information, transition information, and the like. It is contemplated that there can be many variations or other possibilities.

Figure 2:
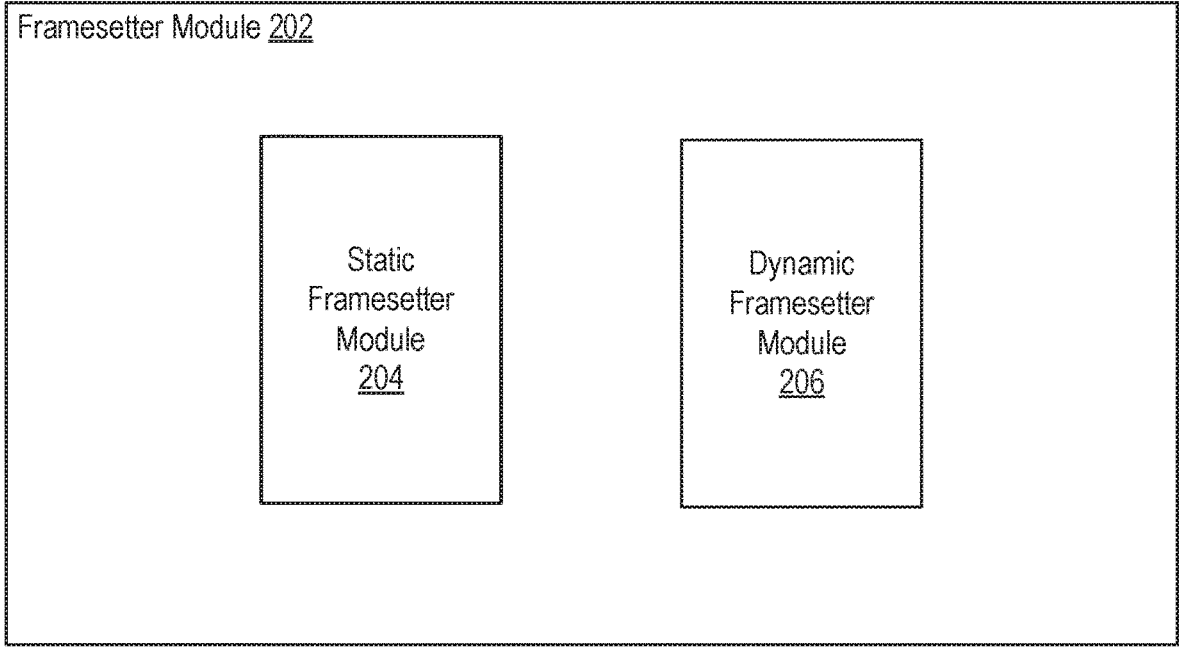
FIG. 2 illustrates an example framesetter module, according to an embodiment of the present disclosure.

FIG. 2 illustrates an example framesetter module 202 configured to define display characteristics that result in display of one or more objects on a user device, according to an embodiment of the present disclosure. In some embodiments, the framesetter module 106 of FIG. 1 can be implemented as the example framesetter module 202. As shown in FIG. 2, the framesetter module 202 can include a static framesetter module 204 and a dynamic framesetter module 206.

The static framesetter module 204 can be configured to define one or more static framesetters, and to cause display of one or more objects on a user device based on one or more static framesetters. As discussed above, one or more static framesetters can each define a set of discrete display characteristics that collectively define a particular display screen. For example, a static framesetter can define a zoomed out image object to be displayed on a user's device, and can include an image file or image file address, dimensions of the image object, a position of the image object, an opacity of the image object, and the like.

The dynamic framesetter module 206 can be configured to define or more dynamic framesetters, and to cause display of one or more objects on a user device based on one or more dynamic framesetters. As discussed above, a dynamic framesetter can be defined by an origin state and a destination state. The dynamic framesetter module 206 can be configured to interpolate between the origin state and the destination state, and to recursively display each interpolated step between the origin state and the destination state, causing an animation that gradually moves from the origin state to the destination state in one or more steps. For example, in the example of moving a red circle from the center of a display to the bottom of the display, the dynamic framesetter module 206 can receive as an origin state a first static framesetter defining a red ball that has a vertical position of 0, representing the vertical position in the center of a user's display. The dynamic framesetter module 206 can receive as a destination state a second static framesetter defining the red ball having a vertical position of −10, representing the vertical position at the bottom of a user's display. The dynamic framesetter module 206 can be configured to interpolate between the origin state and the destination state. For example, if the red ball is to be moved from the center of the display to the bottom of the display in 10 frames, the dynamic framesetter module 206 can interpolate ten different steps between the origin state and the destination state so that each step represents a display state for each frame. After one frame (e.g., t=1), the vertical position of the ball is moved to a vertical position of −1, after two frames (e.g., t=2), the vertical position of the ball is moved to a vertical position of −2, and so forth until, after ten frames (t=10), the ball has been moved to a vertical position of −10 and the bottom of the display.

The dynamic framesetter module 206 can be configured to handle concurrent transitions by receiving as an origin state and/or as a destination state additional dynamic framesetters. For example, if a first dynamic framesetter receives as its origin state a second dynamic framesetter, at each recursive step, the first dynamic framesetter can receive from the second dynamic framesetter its current display state, and interpolate future steps based on the dynamic framesetter's current display state. An example scenario is discussed in greater detail in FIG. 3.

Figure 3:
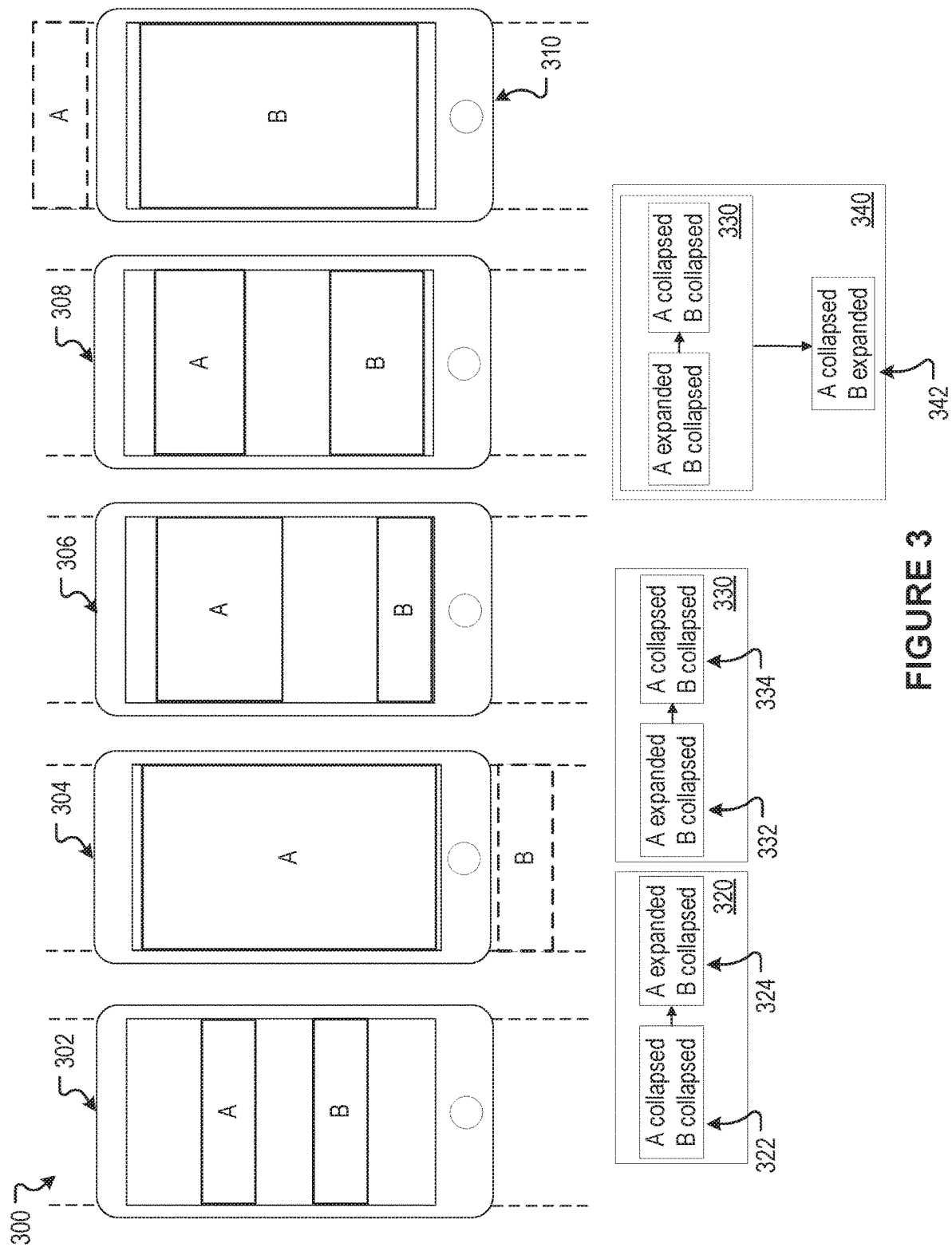
FIG. 3 illustrates an example scenario of concurrent dynamic transitions, according to an embodiment of the present disclosure.

FIG. 3 illustrates an example scenario 300 comprising concurrent transitions, according to an embodiment of the present disclosure. FIG. 3 displays five display states (302, 304, 306, 308, 310) of a user mobile device. In display state 302, two images, image A and image B, are shown in a collapsed state. In display state 304, a transition has taken place in which image A has been expanded, and image B has been pushed off screen (depicted in FIG. 3 as the image B having moved below the display of the user mobile device). This may have occurred, for example, as a result of a user tapping on image A. The transition from display state 302 to the display state 304 is controlled by by a dynamic framesetter 320. The dynamic framesetter 320 includes a static framesetter origin state 322 (A collapsed, B collapsed), and a static framesetter destination state 324 (A expanded, B collapsed). The dynamic framesetter 320 interpolates between the origin state 322 and the destination 324, and recursively updates the display of the user mobile device so that image A gradually expands, and image B gradually moves lower on the screen to accommodate the gradually expanding image A. In certain embodiments, as image A expands, the contents surrounding image A are shifted appropriately to accommodate the expansion of image A. In this example, image B has shifted downward to accommodate the newly expanded image A, and the user could potentially scroll downward to see the still collapsed image B below the now expanded image A.

Display state 306 shows image A in mid-collapse. For example, a user may have tapped on the expanded image A of display state 304, causing it to collapse. This transition of collapsing image A is controlled by a dynamic framesetter 330, which includes a static framesetter origin state 332 (A expanded, B collapsed), and a static framesetter destination state 334 (A collapsed, B collapsed). In display state 306, image B moves back onto the display as image A gradually collapses, and image A has not yet fully collapsed. Before the transition of image A collapsing has completed, the user taps image B to expand image B. This transition is controlled by a dynamic framesetter 340. The dynamic framesetter 340 has as its origin state the dynamic framesetter 330, and as its destination state a static framesetter 342. Two transitions are occurring concurrently, i.e., as image A is collapsing (dynamic framesetter 330), image B is concurrently expanding (dynamic framesetter 340). As the dynamic framesetter 340 recursively updates display characteristics for image A and image B from frame to frame, the dynamic framesetter 340 requests a current display state of the dynamic framesetter 330. At each recursive step, the dynamic framesetter 340 can interpolate between the current display state of the dynamic framesetter 330 and the static framesetter destination state 342. The result is that the dynamic framesetter 330 continues to recursively progress, causing image A to gradually collapse, while the dynamic framesetter 340 concurrently causes image B to gradually expand, and both transitions occur smoothly at the same time. It should be understood that while the presently disclosed example demonstrates two transitions occurring concurrently, the presently disclosed technology can accommodate more than two concurrent transitions. For example, in the scenario shown in FIG. 3, a user can initiate a third transition, and the dynamic framesetter 340 can be utilized as an origin state for a third dynamic framesetter so that three transitions are occurring concurrently. In certain embodiments, a dynamic framesetter can be configured to utilize the same protocols when dealing with static framesetters or dynamic framesetters, such that at each recursive step, a current display state is requested from the origin state framesetter, regardless of whether the origin state framesetter is static or dynamic.

Figure 4:
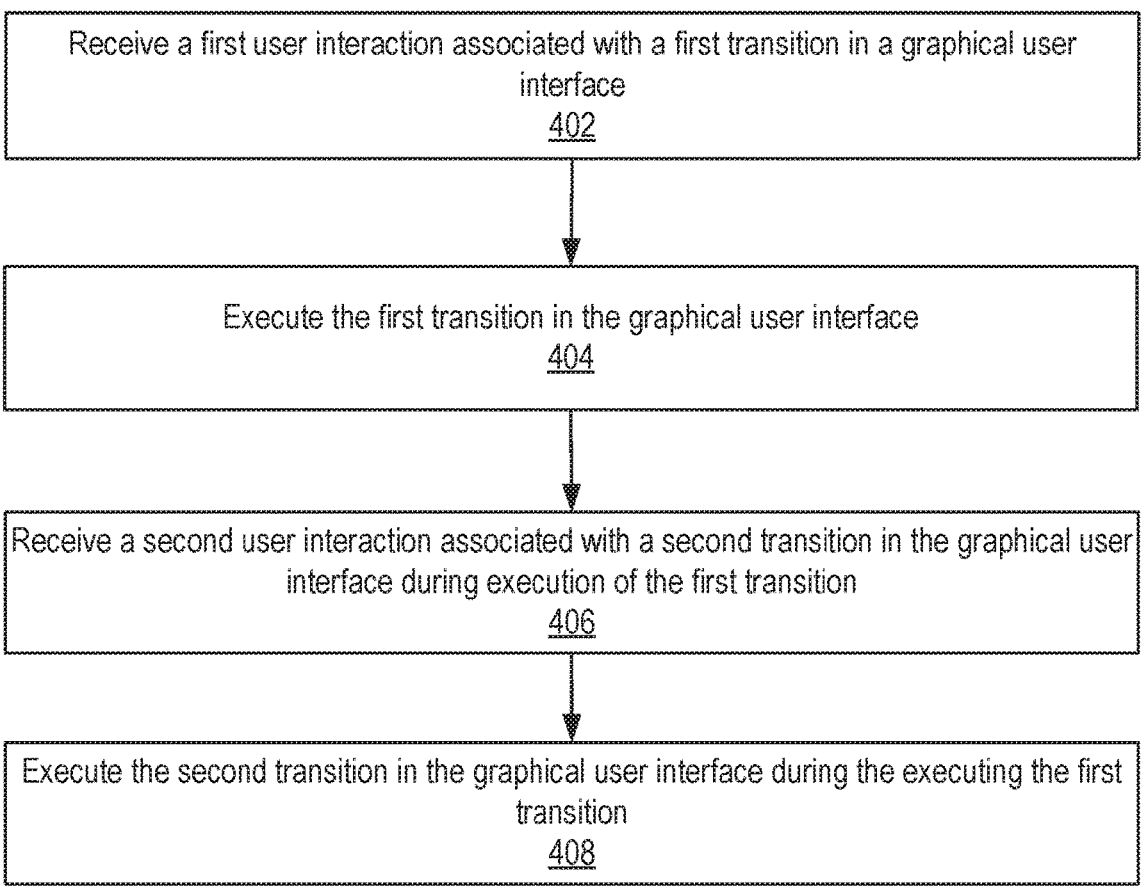
FIG. 4 illustrates an example method for concurrently executing multiple graphical user interface transitions, according to an embodiment of the present disclosure.

FIG. 4 illustrates an example method 400 associated with concurrently executing multiple graphical user interface transitions, according to an embodiment of the present disclosure. It should be appreciated that there can be additional, fewer, or alternative steps performed in similar or alternative orders, or in parallel, based on the various features and embodiments discussed herein unless otherwise stated.

At block 402, the example method 400 can receive a first user interaction associated with a first transition in a graphical user interface. At block 404, the example method 400 can execute the first transition in the graphical user interface. At block 406, the example method 400 can receive a second user interaction associated with a second transition in the graphical user interface during execution of the first transition. At block 408, the example method 400 can execute the second transition in the graphical user interface during executing the first transition. Other suitable techniques that incorporate various features and embodiments of the present technology are possible.

Figure 5:
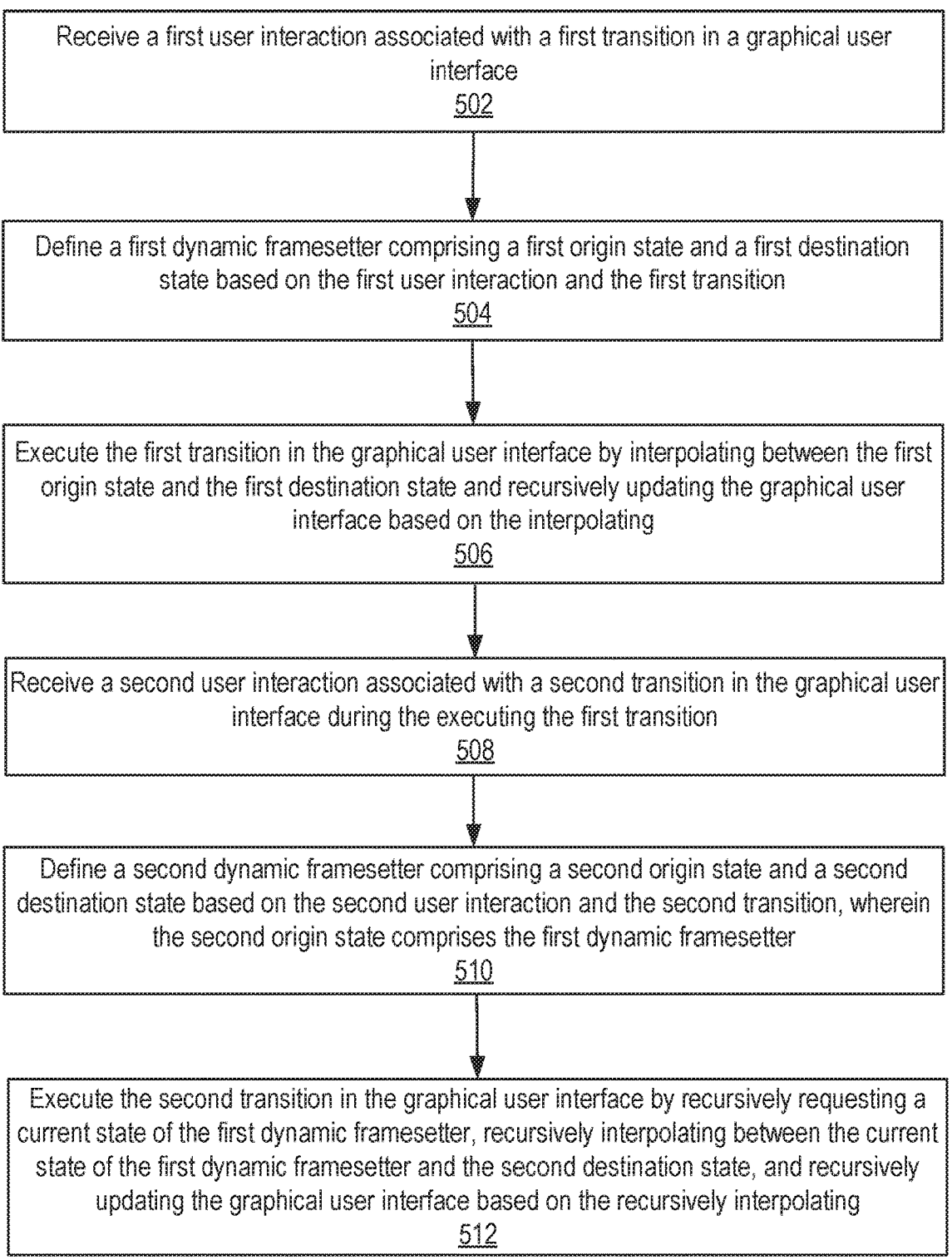
FIG. 5 illustrates an example method for executing multiple dynamic framesetters, according to an embodiment of the present disclosure.

FIG. 5 illustrates an example method 500 associated with executing multiple dynamic framesetters, according to an embodiment of the present disclosure. It should be appreciated that there can be additional, fewer, or alternative steps performed in similar or alternative orders, or in parallel, based on the various features and embodiments discussed herein unless otherwise stated.

At block 502, the example method 500 can receive a first user interaction associated with a first transition in a graphical user interface. At block 504, the example method 500 can define a first dynamic framesetter comprising a first origin state and a first destination state based on the first user interaction and the first transition. At block 506, the example method 500 can execute the first transition in the graphical user interface by interpolating between the first origin state and the first destination state and recursively updating the graphical user interface based on the interpolating. At block 508, the example method 500 can receive a second user interaction associated with a second transition in the graphical user interface during the executing the first transition. At block 510, the example method 500 can define a second dynamic framesetter comprising a second origin state and a second destination state based on the second user interaction and the second transition, wherein the second origin state comprises the first dynamic framesetter. At block 512, the example method 500 can execute the second transition in the graphical user interface by recursively requesting a current state of the first dynamic framesetter, recursively interpolating between the current state of the first dynamic framesetter and the second destination state, and recursively updating the graphical user interface based on the recursively interpolating. Other suitable techniques that incorporate various features and embodiments of the present technology are possible.

Social Networking System—Example Implementation

Figure 6:
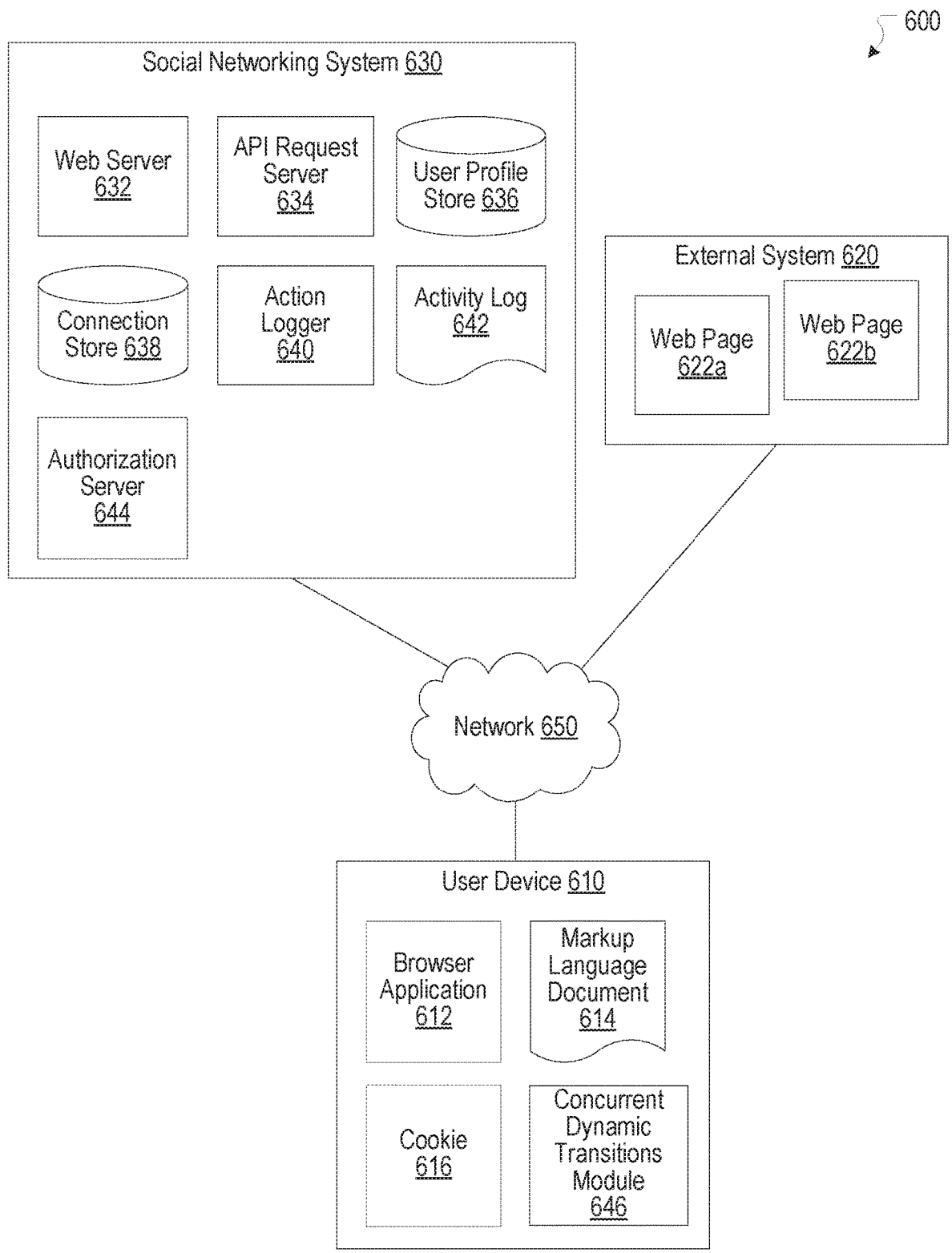
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the user device 610 can include a concurrent dynamic transitions module 646. The concurrent dynamic transitions module 646 can, for example, be implemented as the concurrent dynamic transitions module 102, as discussed in more detail herein. As discussed previously, it should be appreciated that there can be many variations or other possibilities. For example, in some embodiments, one or more functionalities of the concurrent dynamic transitions module 646 can be implemented in the social networking system 630.

Hardware Implementation

Figure 7:
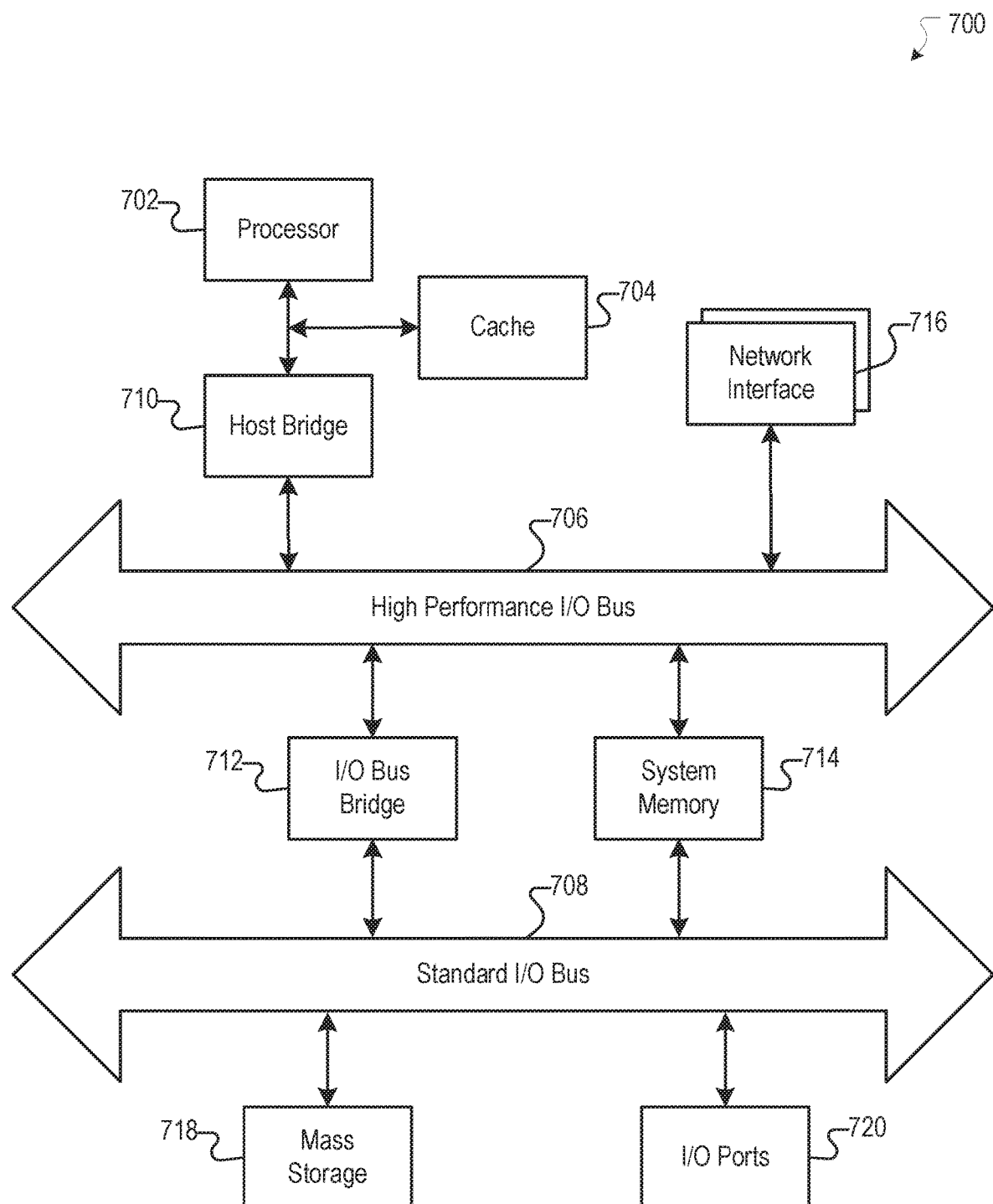
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by a computing system, a first user interaction associated with a first transition in a graphical user interface, wherein the first transition is associated with a first origin state and a first destination state and the first origin state and the first destination state define a first dynamic framesetter;
   executing, by the computing system, the first transition in the graphical user interface by interpolating a first plurality of steps from the first origin state to the first destination state and recursively updating the graphical user interface based on the first plurality of steps, wherein at least some of the first plurality of steps occur after completion of the first user interaction;
   receiving, by the computing system, a second user interaction associated with a second transition in the graphical user interface after completion of the first user interaction and during the executing of the first transition; and
   executing, by the computing system, the second transition in the graphical user interface during the executing of the first transition, wherein the executing of the second transition comprises:
      defining a second dynamic framesetter comprising a second origin state and a second destination state based on the second user interaction and the second transition, wherein the second origin state comprises the first dynamic framesetter;
      recursively requesting a current state of the executing of the first transition;
      recursively interpolating a set of steps between the current state of the executing of the first transition and the second destination state; and
      recursively updating the graphical user interface based on the recursively interpolating the set of steps between the current state of the executing of the first transition and the second destination state.

2. The computer-implemented method of claim 1, wherein at least one of the first origin state, the first destination state, and the second destination state comprises a static framesetter.

3. The computer-implemented method of claim 2, wherein the second origin state of the second dynamic framesetter comprises at least one of a static framesetter or a dynamic framesetter.

4. The computer-implemented method of claim 1, wherein the graphical user interface comprises an interactive article user interface.

5. The computer-implemented method of claim 4, wherein the first transition comprises expansion of an image object in an interactive article.

6. The computer-implemented method of claim 4, wherein the first transition comprises collapse of an image object in an interactive article.

7. A system comprising:
   at least one processor; and
   a memory storing instructions that, when executed by the at least one processor, cause the system to perform a method comprising:
      receiving a first user interaction associated with a first transition in a graphical user interface, wherein the first transition is associated with a first origin state and a first destination state and the first origin state and the first destination state define a first dynamic framesetter;
      executing the first transition in the graphical user interface by interpolating a first plurality of steps from the first origin state to the first destination state and recursively updating the graphical user interface based on the first plurality of steps, wherein at least some of the first plurality of steps occur after completion of the first user interaction;
      receiving a second user interaction associated with a second transition in the graphical user interface after completion of the first user interaction and during the executing of the first transition; and
      executing the second transition in the graphical user interface during the executing of the first transition, wherein the executing of the second transition comprises:
         defining a second dynamic framesetter comprising a second origin state and a second destination state based on the second user interaction and the second transition, wherein the second origin state comprises the first dynamic framesetter;
         recursively requesting a current state of the executing of the first transition;
         recursively interpolating a set of steps between the current state of the executing of the first transition and the second destination state; and
         recursively updating the graphical user interface based on the recursively interpolating the set of steps between the current state of the executing of the first transition and the second destination state.

8. The system of claim 7, wherein at least one of the first origin state, the first destination state, and the second destination state comprises a static framesetter.

9. The system of claim 8, wherein the second origin state of the second dynamic framesetter comprises at least one of a static framesetter or a dynamic framesetter.

10. The system of claim 7, wherein the graphical user interface comprises an interactive article user interface.

11. The system of claim 10, wherein the first transition comprises expansion of an image object in an interactive article.

12. The system of claim 10, wherein the first transition comprises collapse of an image object in an interactive article.

13. A non-transitory computer-readable storage medium including instructions that, when executed by at least one processor of a computing system, cause the computing system to perform a method comprising:
   receiving a first user interaction associated with a first transition in a graphical user interface, wherein the first transition is associated with a first origin state and a first destination state and the first origin state and the first destination state define a first dynamic framesetter;
   executing the first transition in the graphical user interface by interpolating a first plurality of steps from the first origin state to the first destination state and recursively updating the graphical user interface based on the first plurality of steps, wherein at least some of the first plurality of steps occur after completion of the first user interaction;
   receiving a second user interaction associated with a second transition in the graphical user interface after completion of the first user interaction and during the executing of the first transition; and
   executing the second transition in the graphical user interface during the executing of the first transition, wherein the executing of the second transition comprises:
      defining a second dynamic framesetter comprising a second origin state and a second destination state based on the second user interaction and the second transition, wherein the second origin state comprises the first dynamic framesetter;
      recursively requesting a current state of the executing of the first transition;
      recursively interpolating a set of steps between the current state of the executing of the first transition and the second destination state; and
      recursively updating the graphical user interface based on the recursively interpolating the set of steps between the current state of the executing of the first transition and the second destination state.

14. The non-transitory computer-readable storage medium of claim 13, wherein at least one of the first origin state, the first destination state, and the second destination state comprises a static framesetter.

15. The non-transitory computer-readable storage medium of claim 14, wherein the second origin state of the second dynamic framesetter comprises at least one of a static framesetter or a dynamic framesetter.

16. The non-transitory computer-readable storage medium of claim 13, wherein the graphical user interface comprises an interactive article user interface.

17. The non-transitory computer-readable storage medium of claim 16, wherein the first transition comprises expansion of an image object in an interactive article.

18. The non-transitory computer-readable storage medium of claim 16, wherein the first transition comprises collapse of an image object in an interactive article.

* * * * *